United States Patent
Jung (10) Patent No.: US 7,680,406 B2
(45) Date of Patent: Mar. 16, 2010

(54) LIQUID-LENS ASSEMBLY

(75) Inventor: Moon Sik Jung, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 405 days.

(21) Appl. No.: 11/723,150

(22) Filed: Mar. 16, 2007

(65) Prior Publication Data

US 2008/0037973 A1 Feb. 14, 2008

(30) Foreign Application Priority Data

Aug. 10, 2006 (KR) .................... 10-2006-0075747

(51) Int. Cl.
*G03B 3/00* (2006.01)
(52) U.S. Cl. .................... 396/89; 359/252; 359/253; 359/272
(58) Field of Classification Search .................... 396/89, 396/506; 359/252, 253, 272
See application file for complete search history.

(56) References Cited

U.S. PATENT DOCUMENTS

| 5,709,967 | A * | 1/1998 | Larsen .................... 429/175 |
| 6,936,809 | B2 * | 8/2005 | Viinikanoja .................... 250/216 |
| 2006/0044640 | A1 * | 3/2006 | Kato et al. .................... 359/230 |
| 2006/0193064 | A1 * | 8/2006 | Kim .................... 359/811 |
| 2007/0147816 | A1 * | 6/2007 | Humpston et al. ............ 396/72 |
| 2007/0188889 | A1 * | 8/2007 | Chen .................... 359/698 |

FOREIGN PATENT DOCUMENTS

WO    WO 03/069380 A1    8/2003
WO    2005/073761         8/2005

* cited by examiner

*Primary Examiner*—Christopher E Mahoney
*Assistant Examiner*—Warren K Fenwick (57) ABSTRACT

Disclosed herein is a liquid-lens assembly using an electrowetting method. The liquid-lens assembly includes a liquid-lens module, a barrel supporting the liquid-lens module, and a housing coupled to the barrel and having an image sensor. Electrodes are provided on the barrel and the housing, so that current is applied to the liquid-lens module through the electrodes.

14 Claims, 6 Drawing Sheets

FIG.1

(PRIOR ART)

FIG.2

(PRIOR ART)

LIQUID-LENS ASSEMBLY

CROSS REFERENCE TO RELATED APPLICATION(S)

This application claims the benefit of Korean Patent Application No. 10-2006-0075747, filed on Aug. 10, 2006, entitled "liquid-lens assembly", which is hereby incorporated by reference in its entirety into this application.

BACKGROUND OF THE INVENTION

1. Field of the Invention

The present invention relates generally to a liquid-lens assembly using an electrowetting phenomenon and, more particularly, to a liquid-lens assembly, in which the structure for applying current to a liquid-lens module is simplified.

2. Description of the Related Art

Currently, a camera having a controllable focus function is applied to various kinds of portable multimedia equipment, including a mobile communication terminal, a small digital camera, an automatic camera, etc. As technology is gradually developed, efforts to integrate various devices, including a camera, into a single piece of mobile equipment and miniaturize the equipment have been continuously conducted.

In the case of a conventional camera having the controllable focus function, a conventional lens having the controllable focus function is constructed to move along the optical axis of the lens because physical movement of the lens is required in order to set the focus. Hence, the conventional camera must have a large size to some extent. Further, since additional parts required for driving the lens, such as a motor, must be mounted, it is difficult to realize miniaturization of the camera.

Recently, as a camera equipped with a lens having a controllable focus function has been attached to a portable terminal, miniaturization of the camera is more keenly required. Further, when the controllable focus lens is driven in the mechanical method, as in the prior art, problems other than the above-mentioned problems occur. That is, since an electric motor installed to drive the controllable focus lens consumes a considerable amount of battery power, it is technically difficult to mount the controllable focus lens to a mobile terminal. Moreover, in order to control the focus of the lens using the conventional mechanical method, a certain amount of time is required.

Thus, in order to solve the problems, recently, a liquid lens using an electrowetting method has been proposed as an alternative to a conventional zoom lens operated by the mechanical method. Research on the liquid lens has been actively conducted.

The basic construction and function of the liquid lens will be briefly described with reference to PCT WO 03/069380, which discloses the invention dealing with the liquid lens.

Figure 1:
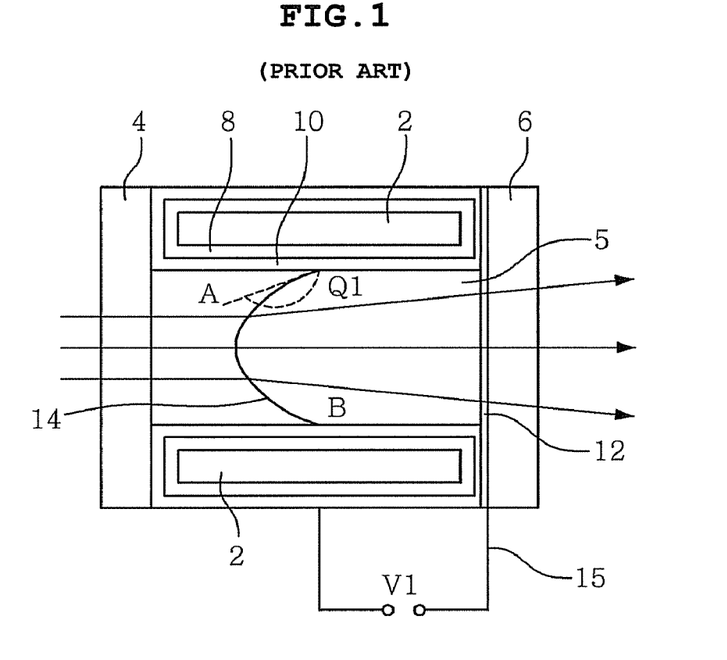
FIGS. 1 to 3 are sectional views showing the construction and operation of a conventional liquid lens.

FIG. 1 is a schematic sectional view showing the liquid lens disclosed in PCT WO 03/069380. The liquid lens will be described with reference to the drawing. As shown in FIG. 1, the liquid lens includes a cylindrical fluid chamber 5, a fluid contact layer 10, a first electrode 2, and a second electrode 12. The fluid chamber 5, having a cylindrical wall, holds a first fluid A and a second fluid B which have different refractive indices, are in contact over a meniscus 14, and are non-miscible. The fluid contact layer 10 is arranged on the inside of the cylindrical wall. The first electrode 2 is separated from the first fluid A and the second fluid B by the fluid contact layer 10. The second electrode 12 functions to activate the second fluid B.

In this case, the first electrode 2 has a cylindrical shape, is coated with an insulating layer 8, and is made of a metallic material. The second electrode 12 is positioned on one side of the fluid chamber 5. Further, a transparent front part 4 and a transparent rear part 6 form a cover of the fluid chamber 5, which holds the two fluids therein.

The operation of the liquid lens, constructed as described above, is as follows.

Figure 2:
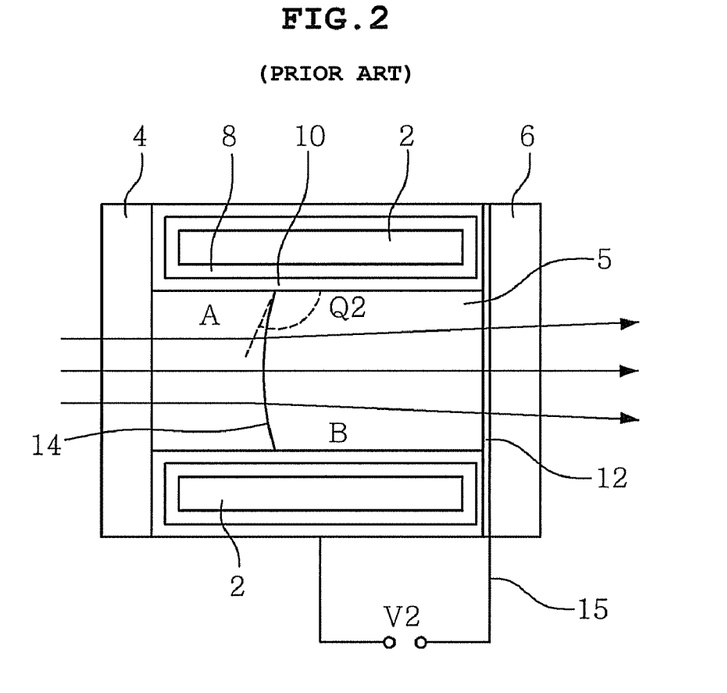
Figure 3:
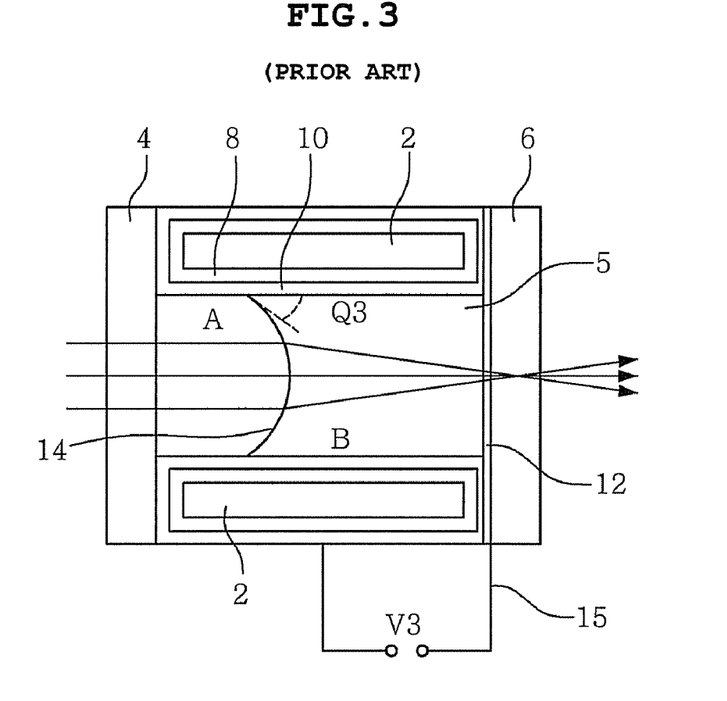

When no voltage is applied between the first and second electrodes 2 and 12, the fluid contact layer 10 has higher wettability by the first fluid A compared to the second fluid B. If voltage V1, V2, or V3 is applied between the first and second electrodes 2 and 12, the wettability relative to the second fluid B varies because of the electrowetting effect, and the contact angle Q1, Q2, or Q3 of the meniscus 14 with the liquid contact layer 10 varies, as shown in the drawings. Thus, the shape of the meniscus 14 varies depending on the applied voltage, and the focus of the liquid lens is controlled using the variation in shape of the meniscus 14.

That is, as shown in FIGS. 1 to 3, the angle between the meniscus 14 and the fluid contact layer 10 measured at the first fluid B according to the magnitude of applied voltage is changed from an obtuse angle to an acute angle, e.g., 140°, 100°, and 60°. In this case, FIG. 1 shows an arrangement having high negative power, FIG. 2 shows an arrangement having low negative power, and FIG. 3 shows an arrangement having positive power. Such a liquid lens using the fluids is advantageous to realize miniaturization of the equipment and reduce power consumption, compared to the conventional lens, the focus of which is controlled in the mechanical driving method.

Meanwhile, as shown in FIGS. 1 to 3, the conventional liquid-lens module is constructed so that an electric wire 15 is directly connected to the liquid-lens module to apply current to the fluid.

However, as described above, according to the conventional method of directly connecting the electric wire to the liquid-lens module, the electric wire must be connected to a connecter which is provided outside the liquid-lens module. Thus, the electric wire must be additionally treated. Further, since the electric wire is provided outside the liquid-lens module, the appearance thereof is untidy. Furthermore, the method of applying current through the electric wire is problematic in that the reliability of the power supply is low.

The basic operational principle and construction of the liquid lens are described with reference to the drawings. The overall construction of a liquid lens assembly, required to apply the liquid-lens module to an end product in practice, and the concrete method of applying current have not been disclosed yet.

Therefore, the applicant of this invention proposes ways to solve the above-mentioned problems.

SUMMARY OF THE INVENTION

Accordingly, the present invention has been made keeping in mind the above problems occurring in the prior art, and an object of the present invention is to provide a liquid-lens assembly, which has a simpler and more reliable structure, by which current can be applied to a liquid-lens module.

Another object of the present invention is to provide a liquid-lens assembly, the shape of which is changed to allow the focus of the liquid-lens assembly to be easily controlled.

In order to accomplish the above objects, the present invention provides a liquid-lens assembly, having a liquid-lens module which uses an electrowetting method and applies current through two electrodes, thus controlling focus, a barrel for supporting the liquid-lens module, and a housing coupled to the barrel via a coupling means and having an image sensor. In this case, first and second electrodes contacting the two electrodes of the liquid-lens module are provided on the barrel, and third and fourth electrodes, connected to the first and second electrodes, respectively, are provided on the housing, so that current is applied through the third and fourth electrodes to the liquid-lens module.

Further, according to the present invention, a barrel for supporting a liquid-lens module, which uses an electrowetting method, and applies current through two electrodes, thus controlling a focus, is characterized in that first and second electrodes, in direct contact with the two electrodes of the liquid-lens module, are provided on the barrel.

The liquid-lens assembly according to the present invention includes a liquid-lens module which uses an electrowetting method, and applies current through two electrodes, thus controlling a focus, a barrel for supporting the liquid-lens module, and a housing which is coupled to the barrel and is provided with an image sensor. The liquid-lens assembly is characterized in that electrode terminals connected to the two electrodes are continuously formed on either the outer circumferential surface or the inner circumferential surface of the housing.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in detail with reference to the accompanying drawings.

Figure 4:
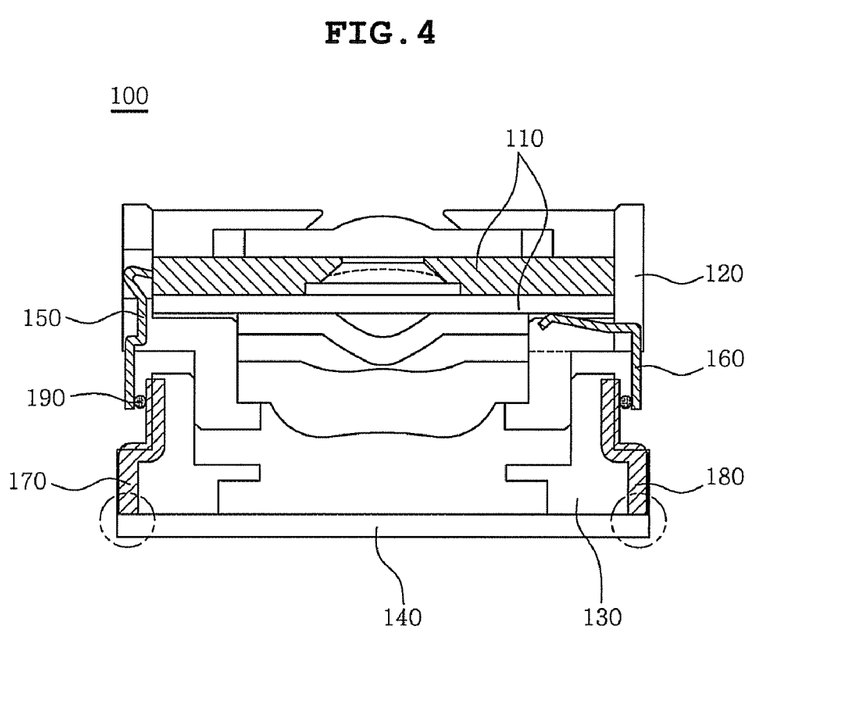
FIG. 4 is a view showing a liquid-lens assembly, according to the present invention.
Figure 5:
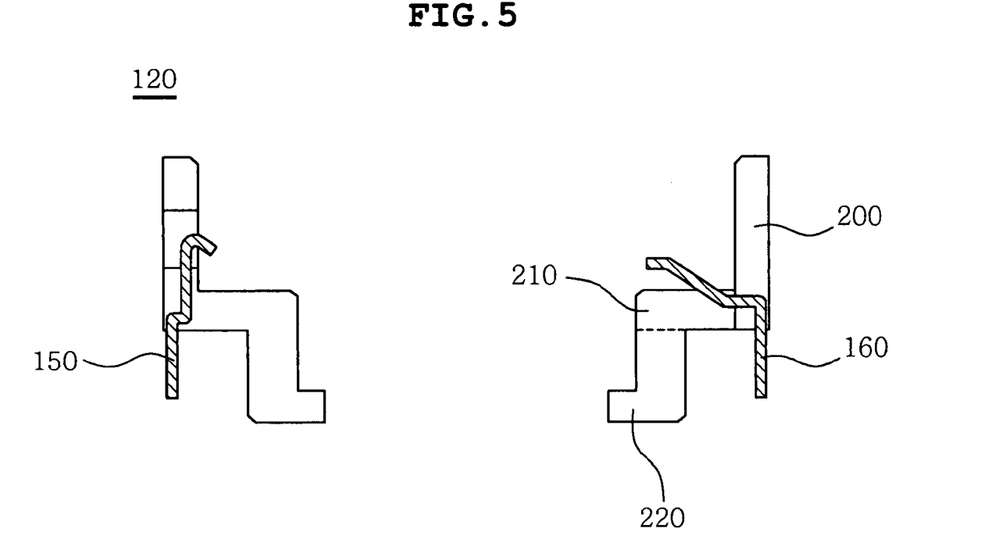
FIG. 5 is a view showing a barrel included in the liquid-lens assembly of FIG. 4.
Figure 6A:
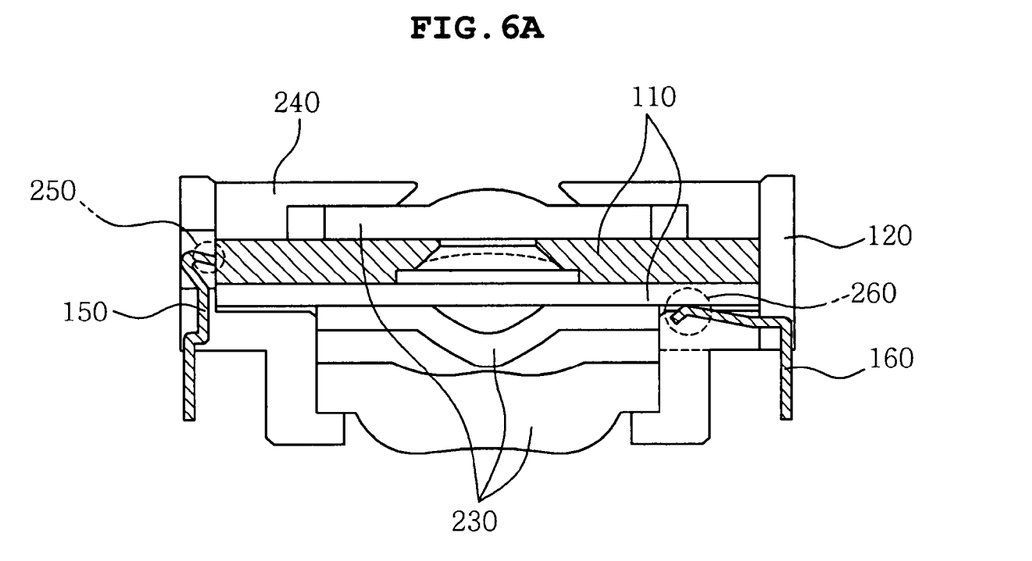
FIG. 6A is a sectional view showing the state where a liquid-lens module and lenses are mounted to the barrel of FIG. 5.
Figure 6B:
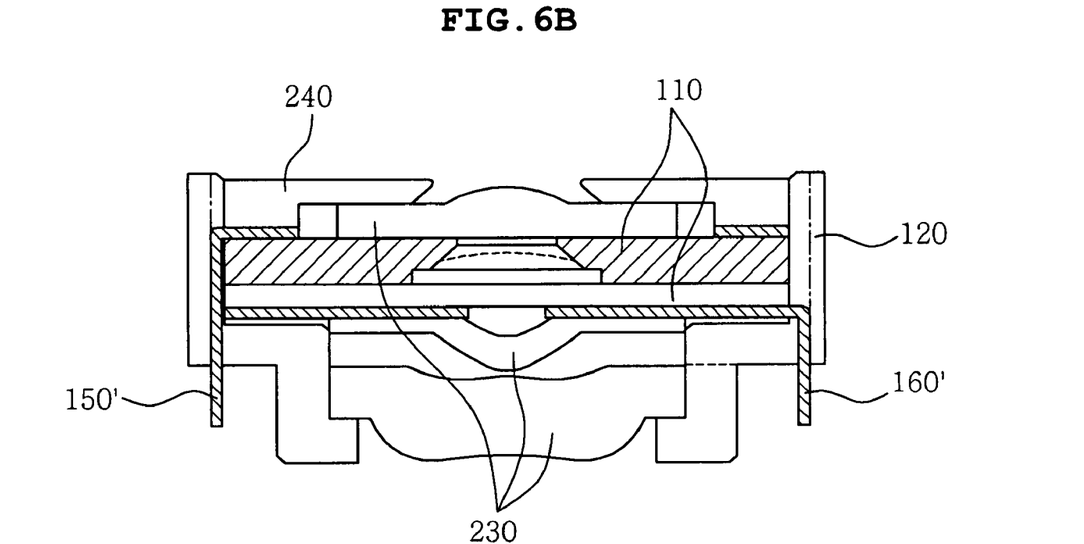
FIG. 6B is a sectional view showing the state where a liquid-lens module and lenses are mounted to a barrel according to a modification of FIG. 5.
Figure 7A:
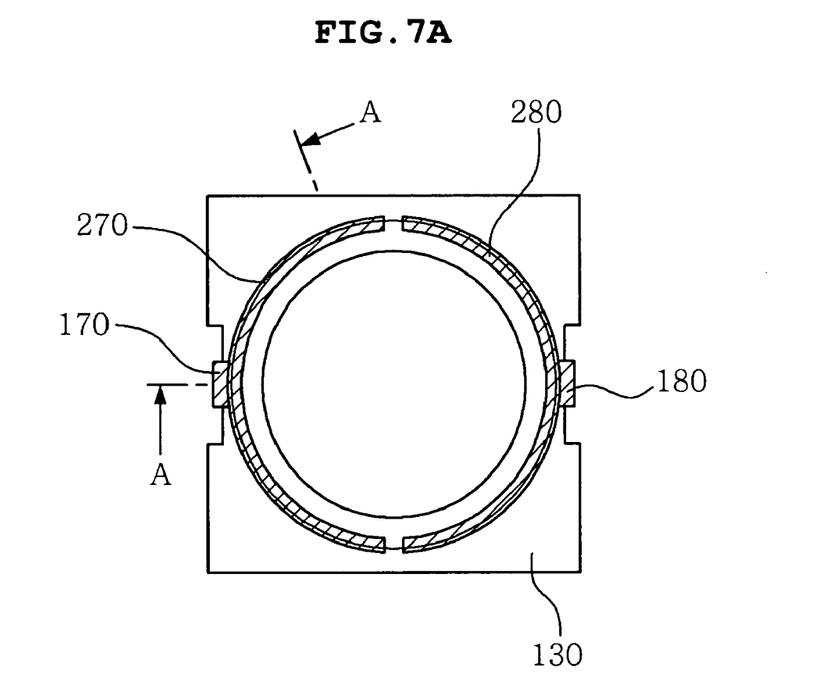
FIGS. 7A and 7B are a plan view and a sectional view, respectively, showing a housing of the liquid-lens assembly, according to an embodiment of the present invention.
Figure 7B:
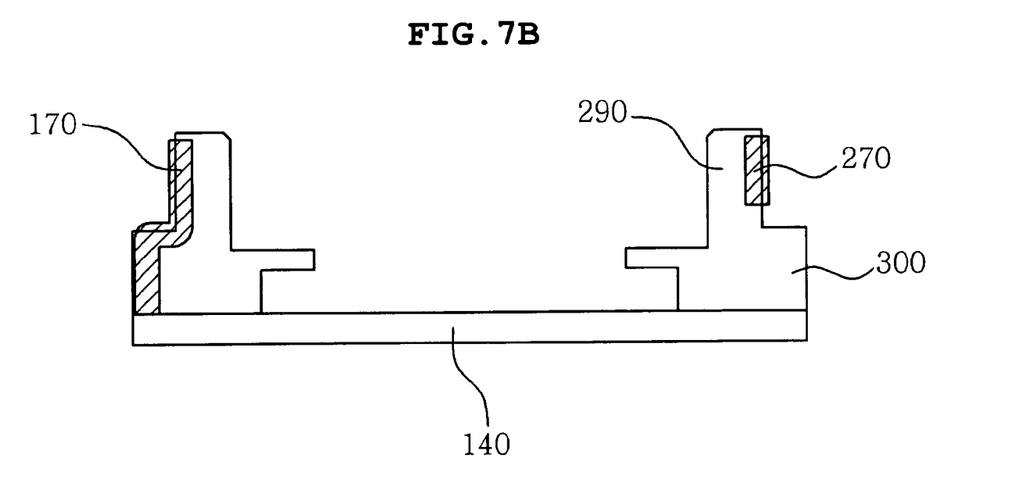
Figure 8A:
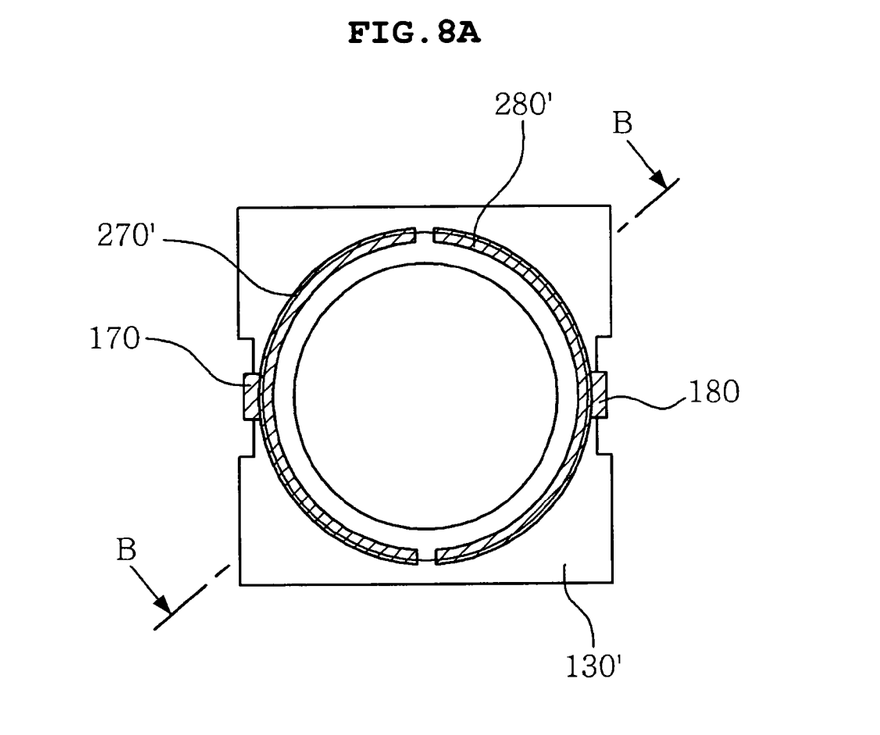
FIGS. 8A to 8C are a plan view, a side view, and a sectional view, respectively, showing a housing of a liquid-lens assembly, according to another embodiment of the present invention.
Figure 8B:
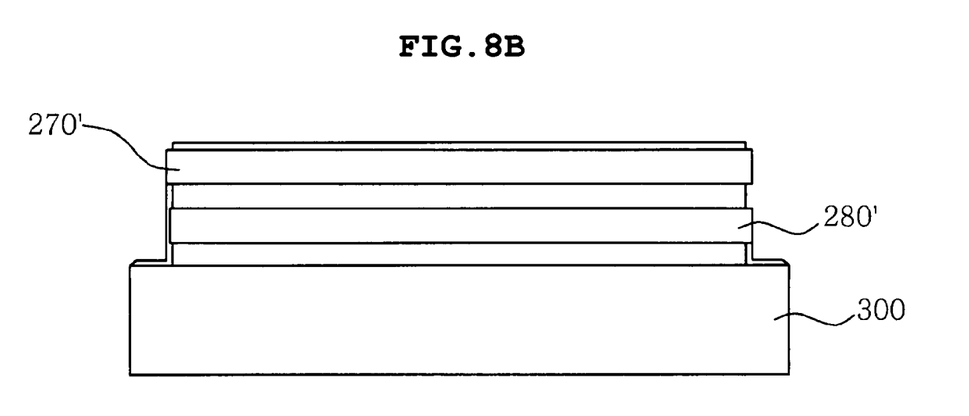

FIG. 4 shows a liquid-lens assembly, according to an embodiment of the present invention, FIG. 5 shows only a barrel, out of the components of the liquid-lens assembly, according to the present invention, FIGS. 6A and 6B show the state where a liquid-lens module is installed in the barrel, FIGS. 7A and 7B show a housing of the liquid-lens assembly, according to the present invention, and FIGS. 8A and 8B show a housing of a liquid-lens assembly according to another embodiment of the present invention.

The liquid-lens assembly 100 according to the present invention includes a liquid-lens module 110, a barrel 120, and a housing 130. The liquid-lens module 110 uses an electrowetting method, and applies current through two electrodes. The barrel 120 supports the liquid-lens module 110. The housing 130 is coupled to the barrel 120 via a coupling means 190, and is provided with an image sensor 140. First and second electrodes 150 and 160, in contact with the two electrodes of the liquid-lens module 110, are provided on the barrel 120. Third and fourth electrodes 170 and 180, which are connected to the first and second electrodes 150 and 160 of the barrel 120, respectively, are provided on the housing 130. Further, as shown by the circles in the drawing, one end of each of the third and fourth electrodes 170 and 180 is connected to the image sensor 140.

The liquid-lens assembly 100 of the invention is constructed to apply current to fluid in the liquid-lens module 110 through the image sensor 140, the third and fourth electrodes 170 and 180, the first and second electrodes 150 and 160, and the electrodes provided in the liquid-lens module 110. Meanwhile, as shown in the drawings, the embodiment of this invention uses solder as the coupling means 190 for coupling the barrel 120 to the housing 130. However, the coupling means 190 is not limited to solder.

As described above, unlike the prior art, in which an electric wire is used to apply current directly to a liquid-lens module, the present invention is characterized in that the electrodes are directly provided on the barrel 120 for supporting the liquid-lens module 110 and the housing 130 having the image sensor 140, thus applying current to the liquid-lens module 110.

Meanwhile, FIG. 5 shows only the barrel 120 according to the present invention. The barrel 120 is described in detail with reference to the drawings. As shown in FIG. 4, the barrel 120 functions to support the liquid-lens module 110 and lenses. According to this embodiment of the invention, the barrel 120 includes a side part 200, a bottom part 210, and a lower support part 220. Further, as described above, in order to support the liquid-lens module 110 and the lenses, the barrel 120 of the invention is constructed so that the bottom part 210 extends perpendicularly from the side part 200, and so that the lower support part 220 is bent at one end to extend perpendicularly from the end thereof. Further, as shown in the drawings, the first electrode 150 and the second electrode 160 are provided in the barrel 120.

Particularly, according to this embodiment of the present invention, the first and second electrodes 150 and 160 are formed in the barrel 120 through insert molding. According to this invention, the electrodes of the barrel 120 are formed through such a molding method, thus realizing a simple and convenient manufacturing process. However, the method of forming the electrodes in the barrel 120 is not limited to the insert molding method. Further, the shape of the barrel 120 according to this invention is not limited to that of this embodiment.

Preferably, the first and second electrodes 150 and 160 provided on the barrel 120 of this invention have elasticity so that they can be easily coupled to the two electrodes of the liquid-lens module 110. In order to provide elasticity to the first and second electrodes 150 and 160, according to this embodiment of the invention, an end portion of the first electrode 150 is formed to have a hook shape, and the second electrode 160 is bent to be inclined in a predetermined direction. Thereby, easy coupling is achieved.

FIG. 6A shows the state where the liquid-lens module 110 and lenses 230 are installed in the barrel 120 constructed as described above. When the liquid-lens module 110 is inserted into the barrel 120 of FIG. 5, as shown in FIG. 6A, the first and second electrodes 150 and 160, formed in the barrel 120, contact respective electrodes of the liquid-lens module 110. Firmer coupling is realized by the elasticity of the first and second electrodes 150 and 160. Contact locations are denoted by reference numerals 250 and 260 in the drawing. Further, a predetermined number of lenses 230 is mounted to the upper and lower portions of the liquid-lens module 110, so that the liquid-lens module 110 and the lenses 230 are installed in the barrel 120. In the drawing, reference numeral 240 denotes a cap, which covers the barrel 120.

Meanwhile, FIG. 6B shows another embodiment of the present invention. The embodiment will be described in detail with reference to the drawings. As shown in FIG. 6B, parts corresponding to the first and second electrodes of the invention directly contact parts corresponding to the electrodes of the liquid-lens module 110 to be secured to the parts. As such, first and second electrodes 150' and 160' of this invention may have any shape, as long as the electrodes contact the liquid lenses and transmit electricity. Further, parts forming the electrodes may be made of a metallic material or an FPC.

As described above, the present invention is constructed so that the electrode means is installed in the barrel 120, and is connected to the two electrodes of the liquid-lens module 110, unlike the prior art. Thus, the present invention has a better appearance and high reliability, compared to the conventional current applying technology.

Meanwhile, FIGS. 7A and 7B show the detailed construction of the housing 130, which is coupled to the barrel 120 via the coupling means and is provided with the image sensor 140. FIG. 7A is a plan view of the housing 130, and FIG. 7B is a sectional view taken along line A-A of FIG. 7A. The housing 130 according to this invention will be described in detail with reference to FIGS. 7A and 7B.

The housing 130 is the part on which the image sensor 140 is provided. According to this embodiment, the housing 130 includes a side part 290 and a bottom part 300. The housing 130 is provided with third and fourth electrodes 170 and 180, which are connected to the two electrodes of the barrel 120, that is, the first and second electrodes 150 and 160, respectively. Especially, the third and fourth electrodes 170 and 180 are connected to electrode terminals provided on the outer circumferential surface of the housing 130, respectively. For example, the third electrode 170 is connected to the third electrode terminal 270, and the fourth electrode 180 is connected to the fourth electrode terminal 280.

In a detailed description, as shown in FIG. 7B, the third electrode 170 of this invention is provided on the housing 130, and the third electrode terminal 270 connected to the third electrode 170 is formed along the outer circumferential surface of the side part 290 of the housing 130, as shown in FIG. 7A. Likewise, the fourth electrode 180 and the fourth electrode terminal 280 are formed in the same manner. When the third and fourth electrodes 170 and 180 formed in this way are connected to the first and second electrodes 150 and 160 of the barrel 120, as shown in FIG. 4, connection between the corresponding electrodes is possible regardless of the coupling direction.

In a detailed description, when the barrel 120 having the liquid-lens module 110 is coupled to the housing 130 having the image sensor 140, especially when the barrel 120 is coupled to the housing 130 to control the focus of the liquid-lens assembly 100 according to the invention, the electrodes provided on the barrel 120 and the housing 130 can be connected to each other regardless of the coupling position. Further, according to this embodiment, the coupling of the electrodes of the barrel 120 with the electrodes of the housing 130 is achieved through soldering. Further, the electrodes provided in the barrel 120 and the housing 130 may be formed through insert molding or thermal fusion.

Meanwhile, one end of each of the third and fourth electrodes 170 and 180 provided in the housing 130 is connected to the image sensor 140. That is, current is applied to the liquid-lens module 110 through the image sensor 140, the two electrodes 170 and 180 of the housing 130, and the two electrodes 150 and 160 of the barrel 120.

Figure 8C:
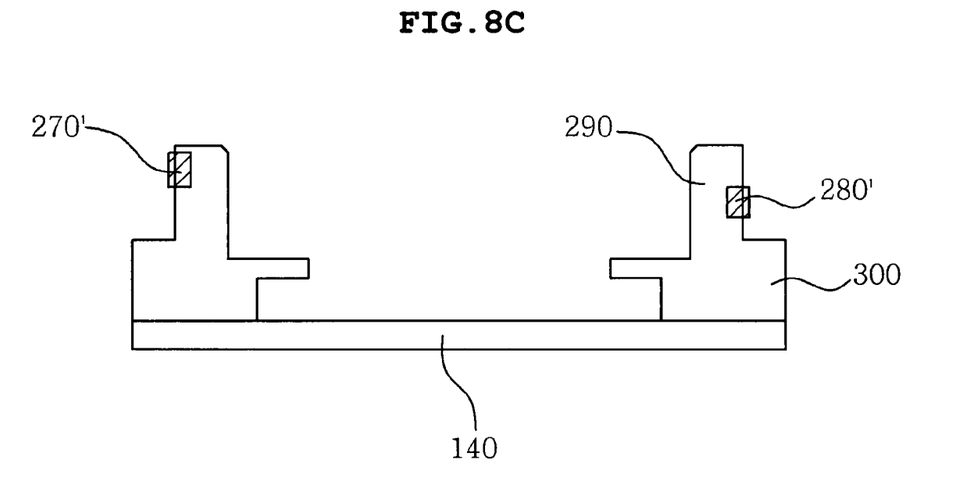

FIGS. 8A to 8C show a housing 130' of a liquid-lens assembly, according to another embodiment of the present invention. FIG. 8A is a plan view of the housing 130', FIG. 8B is a side view of the housing 130', and FIG. 8C is a sectional view taken along line B-B of FIG. 8A. The housing 130' according to this invention will be described in detail with reference to FIGS. 8A to 8C.

According to this embodiment, two electrode terminals provided on the side part 290 of the housing 130', that is, third and fourth electrode terminals 270' and 280', have different heights. This is shown in detail in FIGS. 8B and 8C. That is, as described above, according to this embodiment, the third and fourth electrode terminals 270' and 280' are formed to have different heights. Thus, when terminals having different heights, such as an FPC, are used, in place of the method of applying current to the barrel 120 using the electrodes, it is possible to use the structure of the housing 130' according to this invention.

The liquid-lens assembly of the invention, constructed as described above, is easier to assemble, and more reliable as well as more durable in various environments, compared to the conventional liquid-lens system having the liquid-lens module. Further, the liquid-lens assembly of the invention has a simpler structure and higher operational reliability.

As described above, the present invention provides a liquid-lens assembly, in which the structure for applying current to a liquid-lens module is simplified, thus increasing operational reliability, compared to the prior art.

Further, the present invention provides a liquid-lens assembly, which forms electrode terminals along the outer circumferential surface of a housing, thus allowing the focus to be easily controlled when the liquid-lens assembly is assembled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A liquid-lens assembly comprising:
   a liquid-lens module which uses an electrowetting method and applies current through two electrodes, thus controlling focus;
   a barrel to support the liquid-lens module; and
   a housing coupled to the barrel via coupling means and having an image sensor,
   wherein first and second electrodes have a hook shape or are bent to be inclined in a predetermined direction, thus having elasticity, contact the two electrodes of the liquid-lens module, and are provided on the barrel through insert molding or thermal fusion, and
   wherein third and fourth electrodes, connected to the first and second electrodes, respectively, are provided on the housing through insert molding or thermal fusion, so that current is applied through the electrodes to the liquid-lens module, wherein electrode terminals connected to the third and fourth electrodes are formed through insert molding along an outer circumferential surface or an inner circumferential surface of the housing.

2. The liquid-lens assembly as set forth in claim 1, wherein the third and fourth electrodes are connected to the first and second electrodes, respectively, through soldering.

3. The liquid-lens assembly as set forth in claim 1, wherein the liquid-lens module comprises:
a fluid chamber having an open space therein;
two fluids injected into the fluid chamber, separated from each other via an interface, and having different refractive indices;
a transparent plate to seal the open space of the fluid chamber; and
two electrodes arranged to act on the fluids in the fluid chamber.

4. The liquid-lens assembly as set forth in claim 1, wherein the barrel comprises a side part, a bottom part, and a lower support part to support the liquid-lens module and a predetermined number of lenses, and
the first and second electrodes, through which current is applied to the liquid-lens module, are provided on the barrel.

5. The liquid-lens assembly as set forth in claim 1, wherein the housing comprises a side part coupled to the barrel, and a bottom part to which an image sensor is coupled, and
the third and fourth electrodes, contacting the first and second electrodes provided on the barrel, respectively, are provided on the housing.

6. The liquid-lens assembly as set forth in claim 5, wherein terminals of the third and fourth electrodes provided on the housing are continuously formed along an outer circumferential surface of the housing.

7. The liquid-lens assembly as set forth in claim 5, wherein terminals of the third and fourth electrodes provided on the housing are continuously formed along an outer circumferential surface of the housing in such a way that the terminals have different heights.

8. The liquid-lens assembly as set forth in claim 5, wherein
first ends of the third and fourth electrodes of the housing are connected to the first and second electrodes of the barrel, respectively, and
second ends of the third and fourth electrodes are connected to the image sensor.

9. The liquid-lens assembly as set forth in claim 1, wherein terminals of the third and fourth electrodes provided on the housing are continuously formed along an outer circumferential surface of the housing.

10. The liquid-lens assembly as set forth in claim 1, wherein terminals of the third and fourth electrodes provided on the housing are continuously formed along an outer circumferential surface of the housing in such a way that the terminals have different heights.

11. The liquid-lens assembly as set forth in claim 1, wherein
first ends of the third and fourth electrodes of the housing are connected to the first and second electrodes of the barrel, respectively, and
second ends of the third and fourth electrodes are connected to the image sensor.

12. A liquid-lens assembly comprising:
a liquid-lens module which uses an electrowetting method and applies current through two electrodes, thus controlling focus;
a barrel to support the liquid-lens module; and
a housing coupled to the barrel and having an image sensor,
wherein electrode terminals connected to the two electrodes are continuously formed through insert molding along an outer circumferential surface or an inner circumferential surface of the housing.

13. The liquid-lens assembly as set forth in claim 12, wherein the two electrode terminals are formed to have different heights.

14. The liquid-lens assembly as set forth in claim 12, wherein a first end of each of the two electrode terminals provided on the housing is connected to the image sensor.

* * * * *